United States Patent
Goto

(10) Patent No.: US 7,929,920 B2
(45) Date of Patent: Apr. 19, 2011

(54) ELECTRONIC DEVICE AND PROCESSING PROGRAM THEREOF

(75) Inventor: Yoshihiro Goto, Hamura (JP)

(73) Assignee: Casio Mobile Communications Co., Ltd., Tokyo (JP)

( * ) Notice: Subject to any disclaimer, the term of this patent is extended or adjusted under 35 U.S.C. 154(b) by 253 days.

(21) Appl. No.: 12/150,025

(22) Filed: Apr. 24, 2008

(65) Prior Publication Data

US 2009/0011751 A1    Jan. 8, 2009

(30) Foreign Application Priority Data

May 17, 2007 (JP) .................. 2007-131346

(51) Int. Cl.
*H04B 1/38* (2006.01)
(52) U.S. Cl. ...................... 455/90.3; 455/566
(58) Field of Classification Search .......... 455/575.1, 455/575.3, 90.1, 90.2, 566
See application file for complete search history.

(56) References Cited

U.S. PATENT DOCUMENTS

| | | | |
|---|---|---|---|
| 7,388,578 B2* | 6/2008 | Tao | 345/173 |
| 2005/0164745 A1* | 7/2005 | Oe et al. | 455/566 |
| 2006/0058079 A1 | 3/2006 | Goto | |
| 2007/0004451 A1 | 1/2007 | Anderson | |
| 2007/0149262 A1 | 6/2007 | Navntoft | |
| 2008/0001703 A1 | 1/2008 | Goto | |
| 2008/0051041 A1* | 2/2008 | Griffin et al. | 455/90.3 |

FOREIGN PATENT DOCUMENTS

| | | |
|---|---|---|
| CN | 1879395 | 12/2006 |
| JP | 2003-046604 | 2/2003 |
| JP | 2004-128674 | 4/2004 |
| JP | 2004-228767 | 8/2004 |
| JP | 2006-080878 | 3/2006 |
| JP | 2006 121449 | 5/2006 |
| JP | 2006-166241 | 6/2006 |
| JP | 2006-215935 | 8/2006 |
| JP | 2006-279627 | 10/2006 |

* cited by examiner

*Primary Examiner* — Nick Corsaro
*Assistant Examiner* — Joel Ajayi
(74) *Attorney, Agent, or Firm* — Cohen Pontani Lieberman & Pavane LLP

(57) ABSTRACT

In a cellular phone 10, when a CPU 100 detects that a style of the housing is changed to an "open style" or a "view style", the CPU 100 executes function menu display processing. In the function menu display processing, the CPU 100 automatically selects candidates of function names that are suitable for the current style detected under a predetermined determination condition, and after displaying them in the menu, provides voice guidance thereof. Accordingly, a user does not need to examine which function is suitable for the style. As a result, operability after the style of the housing is changed is enhanced.

12 Claims, 12 Drawing Sheets

FIG. 3

| FUNCTION NAME | NUMBER OF ACTIVATION | |
|---|---|---|
| | OPEN STYLE | VIEW STYLE |
| ADDRESS BOOK | 20 | 1 |
| OUTGOING HISTORY | 13 | 2 |
| INCOMING HISTORY | 14 | 3 |
| DIGITAL TELEVISION | 8 | 20 |
| DIGITAL RADIO | 12 | 7 |
| E-MAIL | 17 | 13 |
| PHOTOGRAPH SHOOTING | 3 | 19 |
| MOVIE SHOOTING | 2 | 11 |
| PHOTOGRAPH REPLAY | 4 | 17 |
| MOVIE REPLAY | 1 | 8 |
| MUSIC REPLAY | 18 | 5 |
| ⋮ | ⋮ | ⋮ |

FIG. 4

| ACTIVATION ORDER | OPEN STYLE | | VIEW STYLE | |
|---|---|---|---|---|
| | FUNCTION NAME | ACTIVATION DATE AND TIME | FUNCTION NAME | AVTIVATION DATE AND TIME |
| 1 | ADDRESS BOOK | 2010/10/10 23:00 | PHOTOGRAPH REPLAY | 2010/10/10 22:00 |
| 2 | E-MAIL | 2010/10/10 20:00 | MOVIE REPLAY | 2010/10/10 21:00 |
| 3 | OUTGOING HISTORY | 2010/10/10 13:00 | PHOTOGRAPH SHOOTING | 2010/10/10 15:00 |
| 4 | INCOMING HISTORY | 2010/10/10 12:00 | DIGITAL TELEVISION | 2010/10/10 10:00 |
| 5 | MUSIC REPLAY | 2010/10/10 09:00 | E-MAIL | 2010/10/10 08:00 |
| ⋮ | ⋮ | ⋮ | ⋮ | ⋮ |

FIG. 5

| SET CONTENT | | SET FLAG |
|---|---|---|
| FUNCTION MENU WHEN STYLE OF PACKAGE IS CHANGED | TO BE AUTOMATICALLY DISPLAYED | 1 |
| | NOT TO BE AUTOMATICALLY DISPLAYED | 0 |

FIG. 6

| TYPE OF DETERMINATION CONDITION | SET FLAG | DETERMINATION CONDITION | | | | |
|---|---|---|---|---|---|---|
| | | CONTENT | OPEN STYLE | | VIEW STYLE | |
| | | | PRIORITY ORDER | FUNCTION NAME | PRIORITY ORDER | FUNCTION NAME |
| STYLE | 1 | — | 1 | ADDRESS BOOK | 1 | DIGITAL TELEVISION |
| | | | 2 | OUTGOING HISTORY | 2 | PHOTOGRAPH SHOOTING |
| | | | 3 | INCOMING HISTORY | 3 | E-MAIL |
| STYLE + SPECIFIED TIME SLOT | 0 | 19:00-22:00 | 1 | ADDRESS BOOK | 1 | E-MAIL |
| | | | 2 | DIGITAL RADIO | 2 | PHOTOGRAPH REPLAY |
| | | | 3 | MUSIC REPLAY | 3 | MOVIE REPLAY |
| | | OTHER THAN ABOVE | 1 | ADDRESS BOOK | 1 | DIGITAL TELEVISION |
| | | | 2 | OUTGOING HISTORY | 2 | PHOTOGRAPH SHOOTING |
| | | | 3 | INCOMING HISTORY | 3 | E-MAIL |
| STYLE + ACTIVATION TIME SLOT | 0 | DISPLAY FUNCTIONS ACTIVATED AT TIME CLOSE TO WHEN STYLE IS CHANGED (IN ORDER OF CLOSENESS TO THE TIME) | | | | |
| STYLE + ACTIVATION ORDER | 0 | DISPLAY FUNCTIONS ACTIVATED RECENTLY (IN ORDER OF CLOSENESS TO CURRENT TIME) | | | | |
| STYLE + NUMBER OF ACTIVATION | 0 | DISPLAY FUNCTIONS WITH LARGE NUMBER OF ACTIVATION (IN THE DESCENDING ORDER OF NUMBER OF ACTIVATION) | | | | |

FIG. 11

| DETERMINATION CONDITION | | OPEN STYLE | | VIEW STYLE | |
|---|---|---|---|---|---|
| | | PRIORITY ORDER | FUNCTION NAME | PRIORITY ORDER | FUNCTION NAME |
| STYLE | | 1 | NEW E-MAIL CREATION (MAIL) | 1 | HORIZONTAL SHOOTING (PHOTOGRAPH SHOOTING) |
| | | 2 | RECEIVED E-MAIL ACKNOWLEDGEMENT (MAIL) | 2 | VERTICAL SHOOTING (PHOTOGRAPH SHOOTING) |
| | | 3 | VARIOUS E-MAIL SETTING (MAIL) | 3 | — |

ELECTRONIC DEVICE AND PROCESSING PROGRAM THEREOF

CROSS-REFERENCE TO RELATED APPLICATION

This application is based upon and claims the benefit of priority from the prior Japanese Patent Application No. 2007-131346, filed May 17, 2007, the entire contents of which is incorporated herein by reference.

BACKGROUND OF THE INVENTION

1. Field of the Invention

The present invention relates to an electronic device that enhances the operability and a processing program of the electronic device to achieve enhancement of operability after the usage style of the housing is changed.

2. Description of the Related Art

Recently, electronic devices with various housing structures have been proposed. For example, in the case of a cellular phone which comprises an operating section housing and a display section housing that are foldably connected thereto, a cellular phone which can be used in a plurality of styles is known. Examples of the plurality of styles are a "close style" which is the state in which the foldable parts are closed and the display section is hidden inside, an "open style" which is the state in which the foldable parts are opened, and a "view style" which is the state in which the foldable parts are closed and the display screen appears on the outside.

In such various styles, the orientations of the screen that are suitable for the operation by a user and the operating sections are different for the individual styles. Accordingly, functions that are suitable for use are different for each style in many cases.

Accordingly, an art such as a cellular phone terminal disclosed in Japanese Laid-Open (Kokai) Patent Publication No. 2006-215935 has been conventionally developed, in which when the menu key is depressed, the opened/closed state of the housing is detected, and the menu items that can be used in accordance with the detected opened/closed state are displayed.

However, the cellular phone terminal disclosed in the Patent Document described above has a following disadvantage. Specifically, when a user desires to use a function of the cellular phone terminal after changing the style of the housing, the user, after having changed the style of the housing, further needs to depress the menu key to carry out menu display instruction operation for instructing to display the function menu in the style after the change. This causes the operation after changing the style to be complicated.

SUMMARY OF THE INVENTION

The present invention has been conceived in light of the foregoing situations, and is to provide an electronic device and a processing program of the electronic device which enhance operability after changing the style of the housing.

In order to achieve the above-described purpose, in accordance with one aspect of the present invention, there is provided an electronic device comprising: a detection means for detecting a style which indicates a usage pattern based on a housing structure of the device; a storage means for storing a determination condition based on which candidates of functions to be used are selected for each style among a plurality of functions provided in the device; and a reporting means for, when the style detected by the detection means is changed, reporting candidates of functions to be selected based on the style detected and on the determination condition stored in the storage means.

In accordance with another aspect of the present invention, there is provided an electronic device comprising: a detection means for detecting a style which indicates a usage pattern based on a housing structure of the device; a storage means for storing a first function name assigned to each style and candidates of a second function to be used under the function having the first function name; a first activating means for, when the style detected by the detection means is changed, reading out the first function name assigned to the detected style from the storage means, and activating the function having the first function name; a reporting means for reading out and reporting the candidates of the second function used under the first function activated by the first activating means from the storage means; and a second activating means for selecting and activating any of the candidates of the second function reported by the reporting means.

According to the present invention, operability after changing the style of the housing is enhanced.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a diagram showing one configuration example of a number of activation storage section 102b provided in a random access memory (RAM) 102;

FIG. 4 is a diagram showing one configuration example of an activation history storage section 102c provided in the RAM 102;

FIG. 5 is a diagram showing one configuration example of an automatic display setting storage section 102d provided in the RAM 102;

FIG. 6 is a diagram showing one configuration example of a determination condition storage section 102e provided in the RAM 102;

FIG. 11 is a diagram showing one configuration example of a determination condition storage section 102e according to a second embodiment.

DETAILED DESCRIPTION OF THE PREFERRED EMBODIMENTS

Hereinafter, the preferred embodiments of the present invention will be described with reference to the drawings.

A. First Embodiment

A-1. System Configuration

Figure 1:
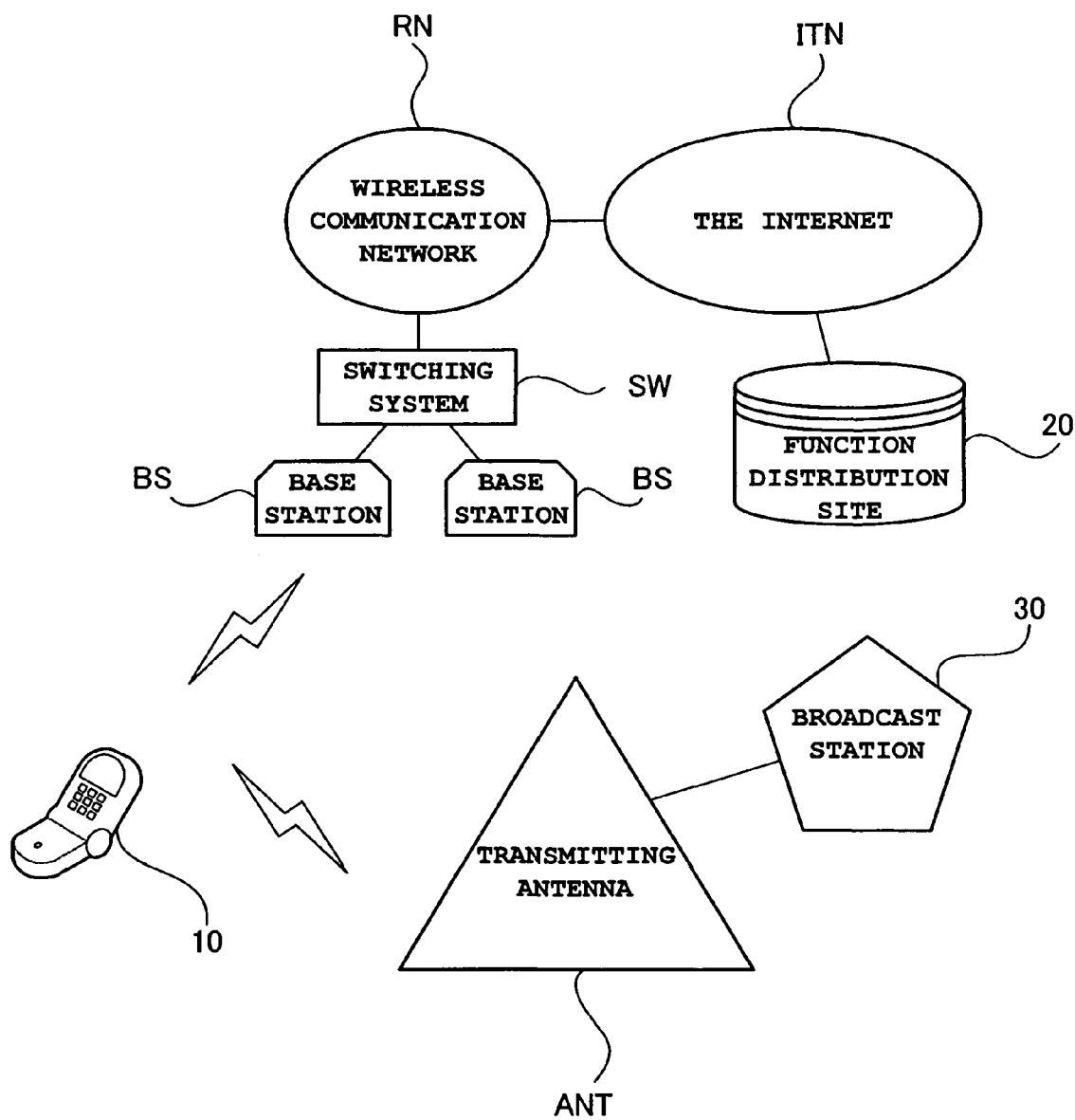
FIG. 1 is a system configuration diagram for describing an outline of functions of a cellular phone 10 according to a first embodiment of the present invention.

FIG. 1 is a system configuration diagram for describing an outline of functions of a cellular phone 10 (electronic device) according to a first embodiment of the present invention.

The cellular phone 10 comprises a mobile wireless communication function and a mail transmission and reception function. In the case where a call is made with use of the mobile wireless communication function, the cellular phone 10 calls to a switching system SW on the originating side via a base station BS in which the location of the cellular phone 10 has been registered. In response to the calling, the switching system SW on the originating side calls up a switching system SW on the receiving side based on an incoming number (subscriber number) inquired from a subscriber registration server (not shown) provided in a wireless communication network RN and on the registered location information. Then, the switching system SW on the receiving side calls on the cellular phone 10 (not shown) on the receiving side via the base station BS on the receiving side. When the receiving side answers the incoming call in response to this, a link between the switching system SW on the originating side and the switching system SW on the receiving side is established, whereby the phone connection is made.

An e-mail to be sent from the cellular phone 10 with use of the mail transmission and reception function is transmitted to a mail server (not shown) on the Internet via the base station BS, the switching system SW and a gateway server (not shown) provided in the wireless communication network RN. The mail server sends an e-mail to a cellular phone 10 that has the e-mail address of the destination in a route opposite to the route as described above.

In addition, the cellular phone 10 uses the mobile wireless communication function to access a function distribution site 20 on the Internet ITN via the base station BS, the switching system SW and the wireless communication network RN. The cellular phone 10 not only receives various contents (image, movie, characters, music) data from the function distribution site 20, but also acquires a program for a function that replays and outputs a predetermined contents data from the function distribution site 20. Furthermore, the cellular phone 10 has a function of receiving a digital television broadcast signal and a digital radio broadcast signal that are transmitted from a transmitting antenna ANT of a broadcast station 30, and of outputting them.

A-2. Configuration of Cellular Phone 10

Figure 2:
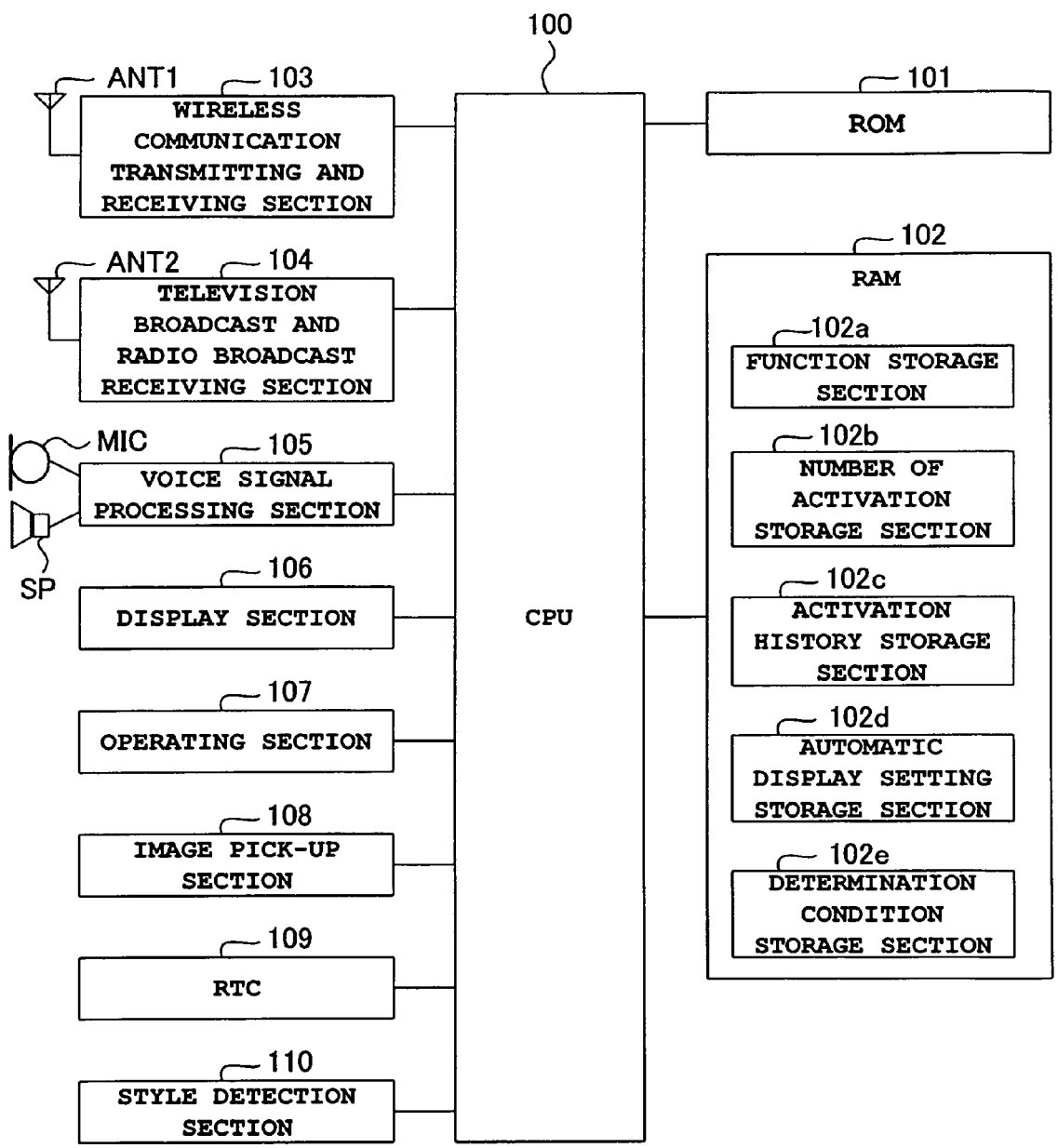
FIG. 2 is a block diagram showing a configuration of the cellular phone 10 according to the first embodiment.

Referring to FIG. 2, the configuration of the cellular phone 10 will now be described. In FIG. 2, a CPU 100 controls operations at various sections in accordance with an event supplied from an operating section 107 (which will be described later). The characteristic processing operations of the CPU 100 related to the summary of the present invention will be described in detail later.

A read only memory (ROM) 101 includes a program area and a data area. The program area of the ROM 101 stores various programs that are executed by the CPU 100. The various programs referred to herein include programs for functions installed in advance, as well as the programs for a main routine and function menu display processing that will be described in detail later. The data area of the ROM 101 stores not only a control data that is referred to by a predetermined program but also various screen data such as a screen data for creating a standby display.

An random access memory (RAM) 102 (storage means) includes a function storage section 102*a*, a number of activation storage section 102*b*, an activation history storage section 102*c*, an automatic display setting storage section 102*d*, and a determination condition storage section 102*e*. The function storage section 102*a* of the RAM 102 stores programs for functions, such as a function downloaded from the function distribution site 20 on the internet ITN or a function acquired from an external storage medium.

The number of activation storage section 102*b* of the RAM 102 stores, for each function name that the cellular phone 10 has, the number of times the function was activated in the "open style" and the number of times the function was activated in the "view style".

FIG. 3 is a diagram showing one configuration example of the number of activation storage section 102*b*. As shown in the diagram, for example, 20 times is stored in the "open style" and 1 time is stored in the "view style" respectively as the number of activation under a function name "address book".

The term "open style" as used herein refers to, in the cellular phone 10 that has a housing structure of a known foldable opening-closing type, the state in which a foldable part is unfolded and the display screen of the display section 106 can be viewed, while the term "view style" refers to the state in which the housing is folded such that the display screen of the display section 106 faces outwards. In addition, in an example shown in FIG. 3, the number of activation is stored. However, an activation frequency may be stored instead. In this case, the activation frequency is determined by counting the numbers of activation within a predetermined period of time, such as one week.

The activation history storage section 102*c* of the RAM 102 stores the activation history information for the various functions stored in the ROM 101 and the function storage section 102*a*. The activation history information is information arranged in activation order relating to the function name and activation date-time for the activated function in "open style" and the function name and activation date-time for the activated function in "view style", respectively. The function activated most recently is ranked as the first place of the activation order. FIG. 4 shows one example of the activation history information stored in the activation history storage section 102*c*. In the example shown in the diagram, the "address book" function activated in the "open style" is ranked as the first place of the activation order, and a "photograph replay" function activated in the "view style" is ranked as the first place of the activation order.

The automatic display setting storage section 102*d* of the RAM 102 stores a set content and a set flag. The set content indicates whether to automatically display the function menu when the style of the housing is changed, and the set flag selects either one of the set contents (that is, whether or not to be automatically displayed). The set flag indicates the selected state when the flag value is "1", and indicates the non-selected state when the flag value is "0". Accordingly, the example as shown in FIG. 5 shows the state in which the set content provided with the set flag having the flag value "1" ("to be automatically displayed") is selected.

The determination condition storage section 102*e* of the RAM 102 stores a determination condition data that is referred to when the function menu is automatically displayed. The determination condition data consists of types of the determination conditions, the set flag, and the determination condition. A plurality of types of the determination conditions are registered, and for each type of the determination condition, the set flag, which specifies the type of the determination condition selected and set by the user, and the determination condition are provided.

FIG. 6 is a diagram showing one configuration example of the determination condition data stored in the determination condition storage section 102e. FIG. 6 shows an example in which a "style", a "style+specified time slot", a "style+activation time slot", a "style+activation order" and a "style+number of activation" have been registered as the types of the determination conditions. In the determination condition of which the type is the "style", the function names of the first to third priority orders assigned to the "open style" and the function names of the first to third priority orders assigned to the "view style" are registered.

In the determination condition of which the type is the "style+specified time slot", the function names of the first to third priority orders assigned to the "open style" and the function names of the first to third priority orders assigned to the "view style" are registered. Specifically, in the example shown in FIG. 6, in the specified time slot 19:00 to 22:00, the function names of the first to third priority orders (an address book, a digital radio, a music replay) assigned to the "open style" and the function names of the first to third priority orders (an e-mail, a photograph replay, a movie replay) assigned to the "view style" are registered. In the time slot other than the above-described time slot, the function names of the first to third priority orders (address book, outgoing history, incoming history) assigned to the "open style" and the function names of the first to third priority orders (digital television, photograph shooting, e-mail) assigned to the "view style" are registered in the time slot other than the above-described time slot.

In the determination condition of which the type is the "style+activation time slot", a determination condition, under which the functions activated at times close to the time when the style is changed are displayed in descending order of closeness, is registered. In the determination condition of which the type is the "style+activation order", a determination condition, under which the functions activated recently are displayed in descending order of closeness to the current time, is registered. In the determination condition of which the type is the "style+number of activation", a determination condition, under which the functions activated a number of times are displayed in descending order of times activated, is registered. The set flag that specifies. Among the plurality of types of the determination conditions that respectively have the determination conditions as described above, the type of the determination condition selected and set by the user is set to the flag value "1". Others are set to the flag value "0". Accordingly, in the example shown in FIG. 6, the "style" is the type of the determination condition that is selected and set by the user.

Referring back to FIG. 2, description of the configuration of the cellular phone 10 is continued.

In FIG. 2, a wireless communication transmitting and receiving section 103 carries out data transmission with the base station BS via the antenna ANT1 under the control of the CPU 100 at the time of data communication. At the time of voice communication, the wireless communication transmitting and receiving section 103 outputs voice data which has been received and demodulated via the antenna ANT1 to the CPU 100, while it amplifies at high frequency a transmission signal acquired by modulating the voice data supplied from the CPU 100, and sends the signal from the antenna ANT1. A television broadcast and radio broadcast receiving section 104 receives and demodulates a television broadcast signal or a radio broadcast signal via an antenna ANT2 in accordance with channel selection instruction provided by the CPU 100, and outputs a received signal (video/television voice data when receiving television broadcast, and radio voice data when receiving radio broadcast) acquired by this reception and demodulation to the CPU 100.

A voice signal processing section 105, including a speaker SP and a microphone MIC, performs digital/analog conversion of voice data supplied from the CPU 100 to a voice signal and generates a sound from the speaker SP, and performs analog/digital conversion of a voice signal outputted from the microphone MIC to a voice data and supplies the voice data to the CPU 100. In addition, when the television broadcast and radio broadcast receiving section 104 is in the receiving operation, the voice signal processing section 105 performs digital/analog conversion of television voice data or radio voice data supplied from the CPU 100 and subsequently amplifies it, and generates a sound from the speaker SP.

The display section 106, consisting of a color liquid crystal panel and a display driver, displays various screens such as the standby display, a function menu display or the like under the control of the CPU 100. In addition, when the television broadcast and radio broadcast receiving section 104 is in the television broadcast receiving operation, the display section 106 displays a video in accordance with a display control signal supplied from the CPU 100. The operating section 107 (selection means) includes various operation keys and various operation buttons. Examples of the various operation keys include a power switch for turning ON and OFF the power, an on-hook/off-hook switch to be operated at the start/end of a call, a character input switch that also serves as dial switch. Examples of the various operation buttons include a shutter button to be operated when photographing, and buttons for performing a setting operation and a function activation operation, which will be described later. This operating section 107 generates an event in accordance with the operation of these keys and buttons, and outputs the event to the CPU 100. The setting operation and the function activation operation will be described later.

An image pick-up section 108 picks up an image and outputs it through the operation of the shutter button by the user in accordance with photographing parameters (an ISO sensitivity and a shutter speed). The photographing parameters are specified by the CPU 100 in accordance with the brightness of the subject. A real time computer (RTC) 109 generates a real time clock that is used for time keeping or timer interruption. A style detection section 110 (detection means) detects the "open style" or the "close style" in accordance with the opening and closing operation of the cellular phone 10 that has the package structure of a foldable opening-closing type. The "open style" is the state in which the display screen of the display section 106 can be viewed by unfolding the foldable part, and the "close style" is the state in which the foldable part is folded. Then, the style detection section 110 generates a style data which indicates the detected style. Meanwhile, the style detection section 110 detects the "view style" when the package is in the state where it is folded such that the display screen of the display section 106 faces outwards, and generates the style data which indicates the detected style.

The style as used herein refers to a usage pattern based on the housing structure of the cellular phone 10 (electronic device). The CPU 100 herein realizes the functions of the activating means and the stopping means. In addition, the CPU 100, the voice signal processing section 105 and the display section 106 realizes the function of the reporting means.

A-3. Operation

Next, the operation of the cellular phone 10 according to the above-described configuration will be described. Hereinafter, the operation of the "main routine" that is executed by the CPU 100 of the cellular phone 10 will be described referring to FIG. 7 to FIG. 8. The operation of the "function menu display processing" called by the main routine will be described referring to FIG. 9 to FIG. 10.

(1) The Operation of the Main Routine

Figure 7:
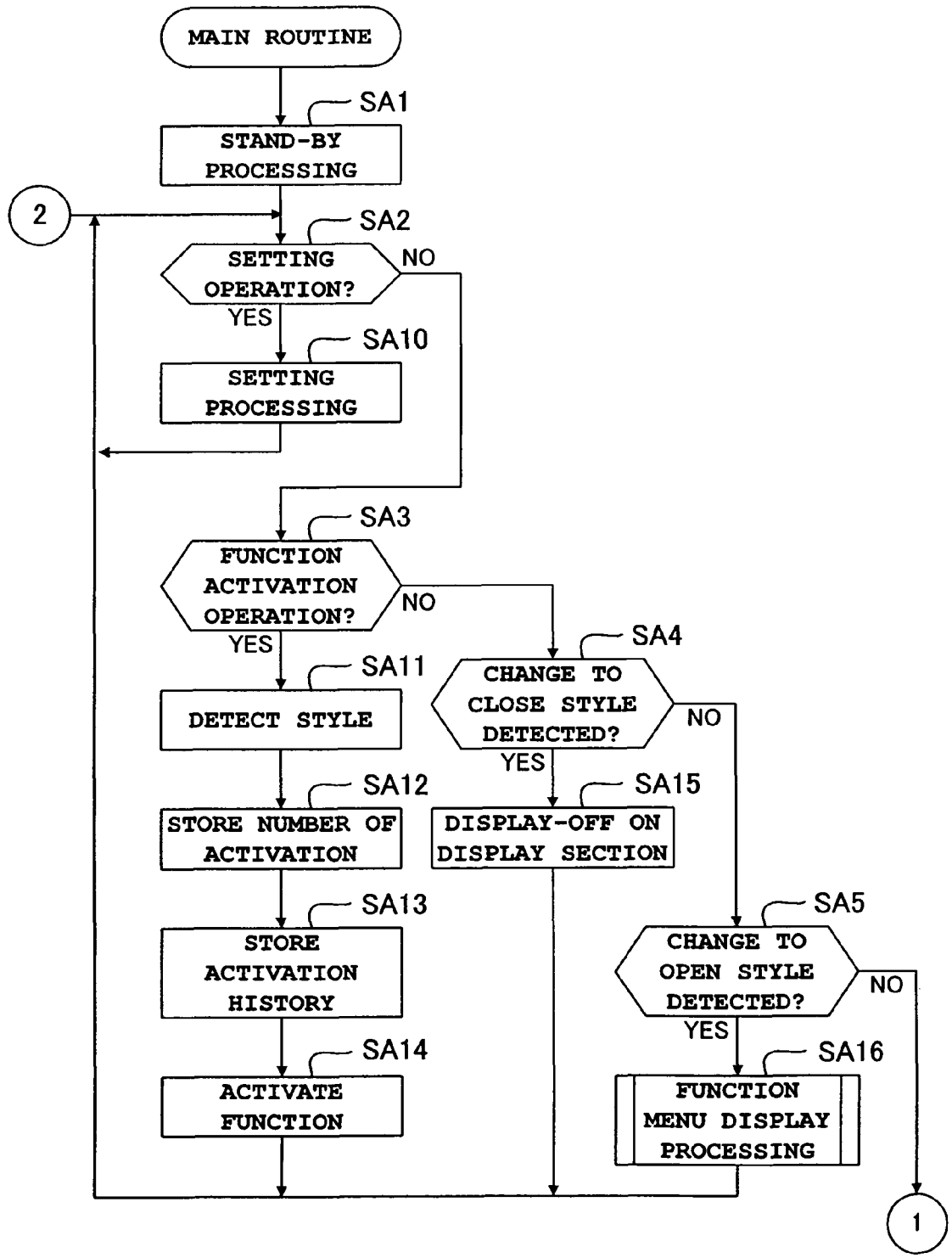
FIG. 7 is a flowchart showing an operation of a main routine.
Figure 8:
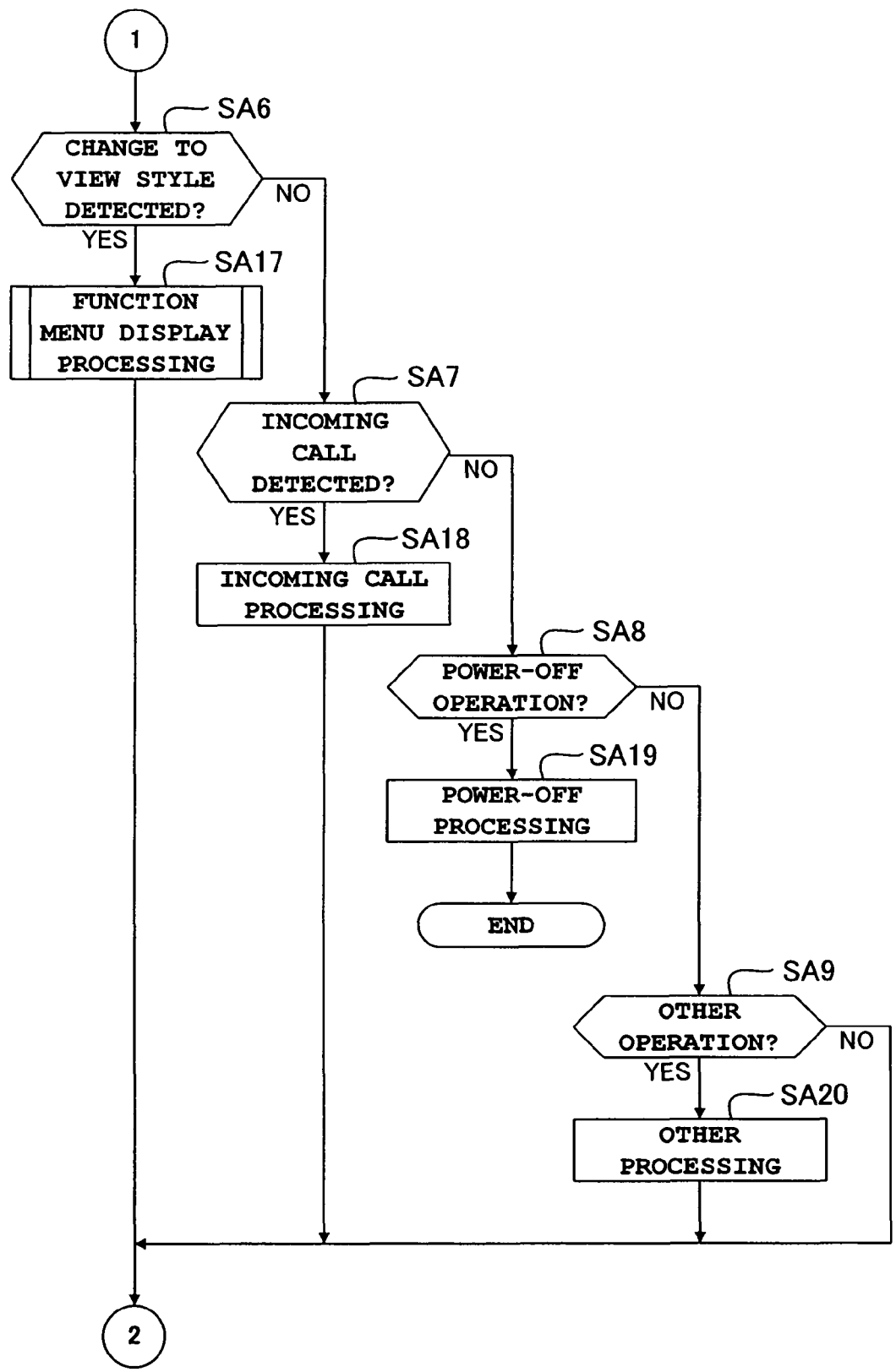
FIG. 8 is a flowchart showing an operation of the main routine.

FIG. 7 and FIG. 8 are flowcharts showing the operation of the main routine that is executed by the CPU 100. When the power of the cellular phone 10 is turned ON through the power-ON operation by the user, the CPU 100 executes the main routine shown in FIG. 7 and advances the processing to Step SA1. At Step SA1, the CPU 10 executes the position registration control sequence on the network side to register the position, and subsequently executes the stand-by processing to enter the stand-by state.

At Steps SA2 to SA5 shown in FIG. 7 and Steps SA6 to SA9 shown in FIG. 8, the CPU 100 judges whether or not any of the events are generated. The events are a "setting operation", a "function activation operation", a "detection of change to close style", a "change to open style detected", a "change to view style detected", "incoming call detected", "power-OFF operation" and "other operation". When none of these events is not generated, all judgment results at Steps SA2 to SA9 as described above are "NO", and the CPU 100 remains standing by in the stand-by state. On the other hand, When any of the events as described above is generated in the stand-by state, the CPU 100 executes the processing corresponding to the event that has been generated. The operations for the individual events will hereinafter be described in detail.

a. When the Setting Operation is Performed

When the setting operation is performed, the judgment result at Step SA2 becomes "YES", and the CPU 100 advances to Step SA10 where it executes the setting processing. In the setting processing, the CPU 100 controls the set flag stored in the automatic display setting storage section 102d of the RAM 102 (see FIG. 5) so as to set whether or not to automatically display the function menu after the style is changed. In addition, in the setting processing, the CPU 100 controls the set flag stored in the determination condition storage section 102e of the RAM 102 (see FIG. 6) so as to specify the type of the determination condition and set the determination conditions (such as the function name and the time slot). When such setting processing is completed, the CPU 100 returns the processing to Step SA2 as described above and returns to the stand-by state.

b. When the Function Activation Operation is Performed

When the function activation operation for activating a function such as an address book function and a digital television function is performed, the judgment result at Step SA3 becomes "YES", and the CPU 100 advances to Step SA11 where it detects a current style based on the style data generated by the style detection section 110. Subsequently, at Step SA12, the CPU 100 stores the number of activation in the number of activation storage section 102b of the RAM 102. Specifically, the numbers of activation associated with the function name and the style are stored in the number of activation storage section 102b of the RAM 102 (see FIG. 3), and among such numbers of activation, the CPU 100 increments the number of activation that is specified by the function name of the function activated through the function activation operation and by the current style detected at Step SA11 as described above, and advances in the routine.

Next, at Step SA13, the CPU 100 updates the activation history in the activation history storage section 102c of the RAM 102 (see FIG. 4). Specifically, among the activation history information registered in the activation history storage section 102c, the CPU 100 decrements, by one, each of the activation orders of the activation history information which corresponds to the current style detected at Step SA11 as described above. At the same time, the CPU 100 newly registers, as new activation history information of the first activation order, the function name and the activation date and time (current date and time) of the function activated through the function activation operation. Then, at Step SA14, the CPU 110 executes the function activated through the function activation operation. When activation of the function is thus completed, the CPU 100 returns the processing to Step SA2 as described above, and returns to the stand-by state.

c. When a Change to the Close Style is Detected

When the housing is folded, and the CPU 100 detects that it has been changed to the "close style" based on the style data generated by the style detection section 110 in response to the folding of the package, the judgment result at Step SA4 becomes "YES", and the CPU 100 advances to Step SA15, where the CPU 100 instructs the display-OFF to the display section 106. As a result of this, the display section 106 turns OFF a backlight LCD and sets the state to the display-OFF state. Then, after completing the instruction of the display-OFF to the display section 106, the CPU 100 returns the processing to Step SA2 as described above, and returns to the stand-by state.

d. When a Change to the Open Style is Detected

When the folded housing is unfolded and the CPU 100 detects that it has been changed to the "open style" based on the style data generated by the style detection section 110 in response to the unfolding of the housing, the judgment result at Step SA5 becomes "YES", and the CPU 100 executes the function menu display processing via Step SA16. In the function menu display processing, the CPU 100 automatically selects candidates of the function names that are suitable for the "open style" in accordance with the predetermined determination conditions to display the menu, and provides voice guidance thereof, as will be described later. Then, when such function menu display processing is completed, the CPU 100 returns the processing to Step SA2 as described above and returns to the stand-by state.

e. When a Change to the View Style is Detected

When the cellular phone 10 becomes in the state where the housing is folded such that the display screen of the display section 106 faces outwards, the CPU 100 detects that it has been changed to the "view style" based on the style data generated by the style detection section 110. Then, the judgment result at Step SA6 shown in FIG. 8 becomes "YES", and the CPU 100 executes the function menu display processing via Step SA17. In the function menu display processing, the CPU 100 automatically selects candidates of the function names that are suitable for the "view style" in accordance with the predetermined determination conditions to display the menu, and provides voice guidance thereof, as will be described later. Then, when such function menu display processing is completed, the CPU 100 returns the processing to Step SA2 as described above, and returns to the stand-by state.

f. When an Incoming Call is Detected

When the CPU 100 detects an incoming call, the judgment result at Step SA7 shown in FIG. 8 becomes "YES", and the CPU 100 advances to Step SA18 where it executes incoming call processing. In the incoming call processing, the CPU 100 performs incoming call reporting. When an OFF-hook operation is performed during the incoming call reporting, the CPU 100 executes call processing of connecting the line to the calling side to initiate a call and of disconnecting the line in response to an ON-hook operation. Subsequently, the CPU 100 returns the processing to Step SA2 as described above, and returns to the stand-by state.

g. When the Power-OFF Operation is Performed

In this case, the judgment result at Step SA8 shown in FIG. 8 becomes "YES", and the CPU 100 advances to Step SA19, where the CPU 100 executes power-OFF processing and then completes the processing.

h. When Other Operation is Performed

In the case where an operation other than the operations described above is performed, the judgment result at Step SA9 shown in FIG. 8 becomes "YES", and the CPU 100 advances to Step SA20, where it executes other processing. The other processing, for example, refers to the processing such as an e-mail creation and e-mail transmission. Then, after executing the other processing, the CPU 100 returns the processing to Step SA2 as described above, and returns to the stand-by state.

(2) The Operation of the Function Menu Display Processing

Figure 9:
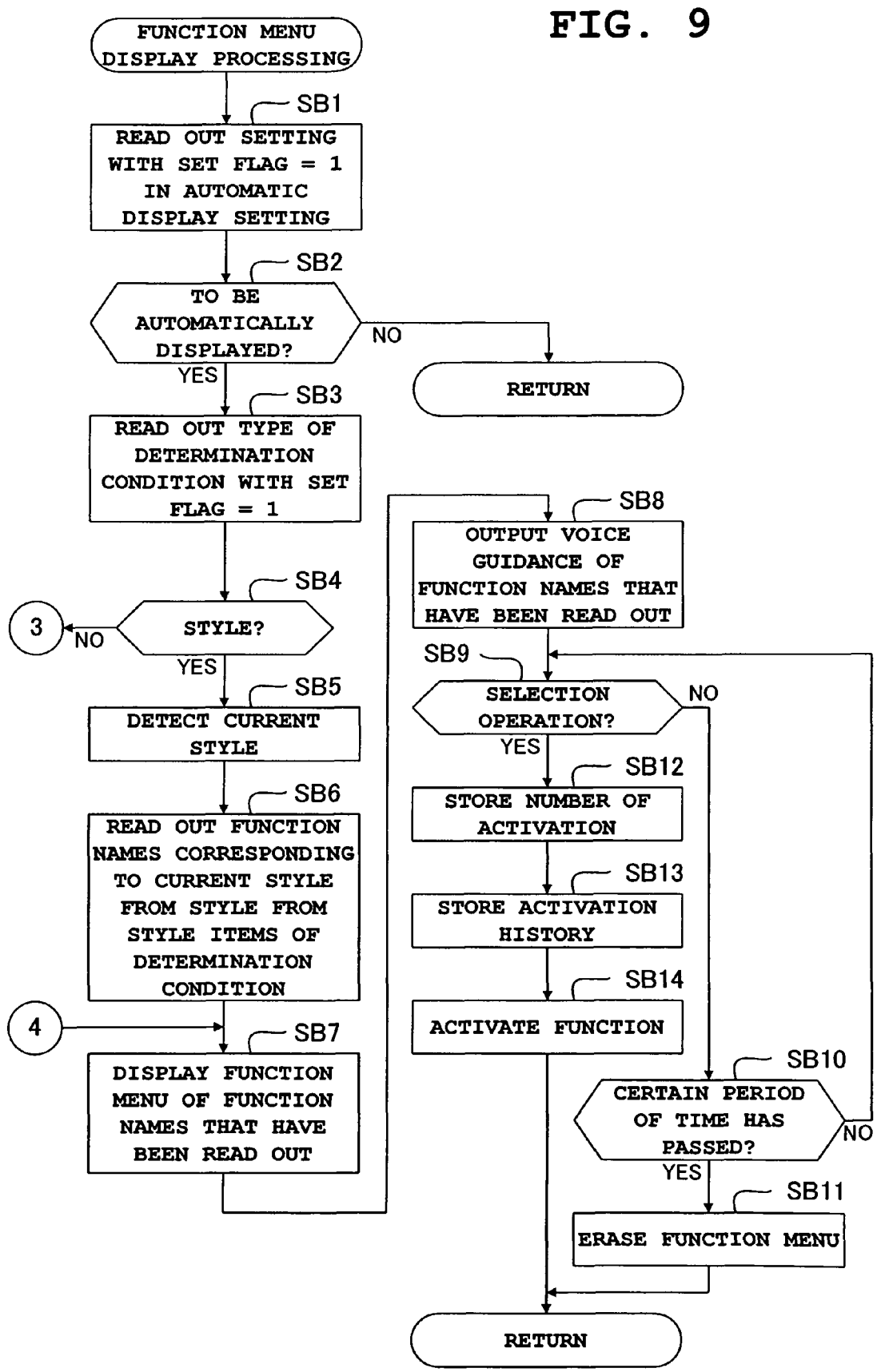
FIG. 9 is a flowchart showing an operation of function menu display processing.
Figure 10:
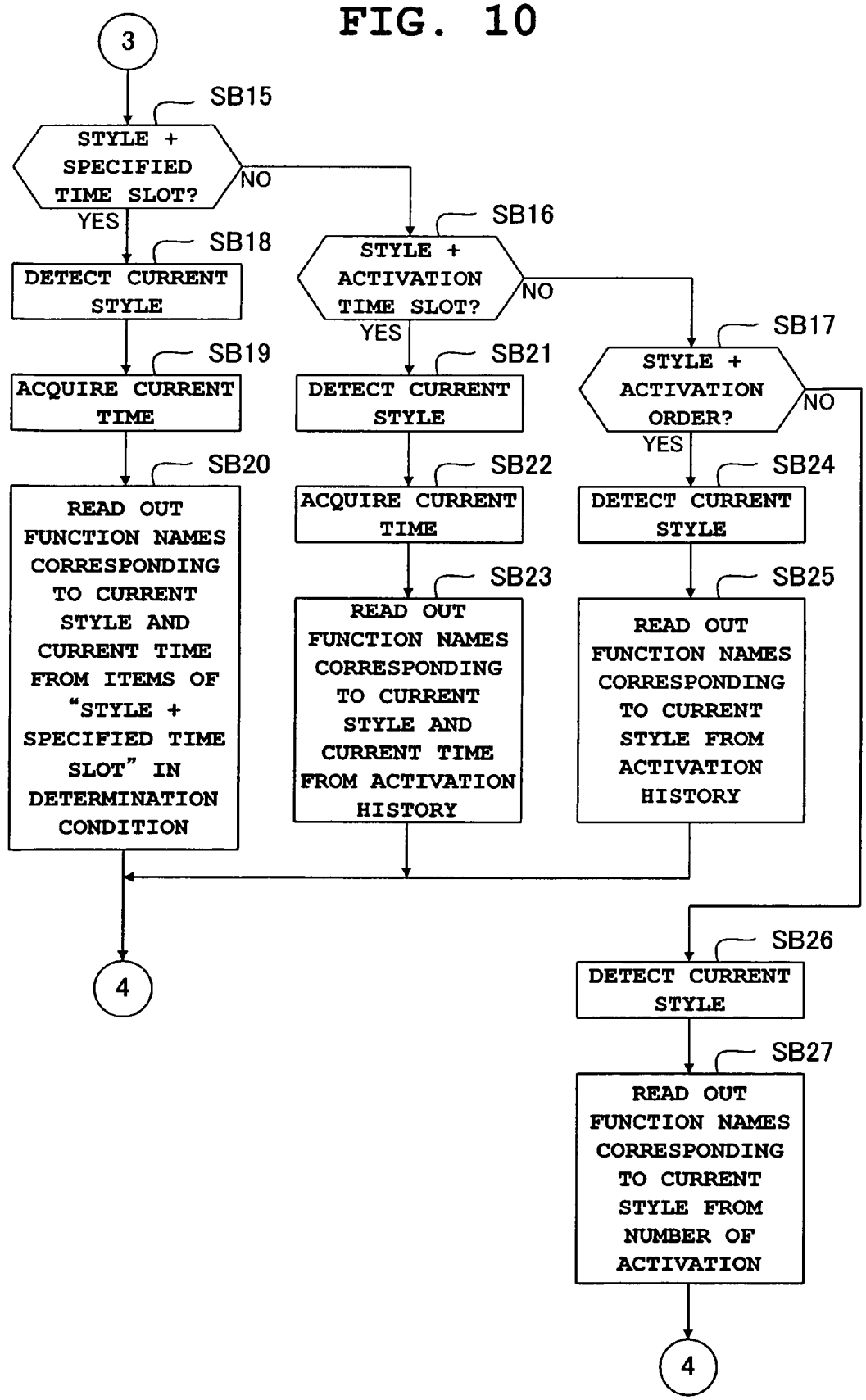
FIG. 10 is a flowchart showing an operation of the function menu display processing.

FIG. 9 and FIG. 10 are flowcharts showing the operation of the function menu display processing that is executed by the CPU 100. When the processing is executed via Step SA16 (see FIG. 7) or Step SA17 (see FIG. 8) of the main routine as described above, the CPU 100 advances the processing to Step SB1 as shown in FIG. 9. At Step SB1, the CPU 100 reads out the set content of which the set flag is "1" from the automatic display setting storage section 102*d* of the RAM 102 (see FIG. 5). Subsequently, at Step SB2, the CPU 100 judges whether or not the set content read out from the automatic display setting storage section 102*d* at the above-described Step SB1 is "be automatically displayed". When judged that the set content read out is "not to be automatically displayed", the judgment result in this case becomes "NO" and the CPU 100 completes the processing.

On the contrary, when judged that the set content read out from the automatic display setting storage section 102*d* is "to be automatically displayed", the judgment result at the above-described Step SB2 becomes "YES", and the CPU 100 advances to Step SB3. At Step SB3, the CPU 100 reads outs, among the determination condition data stored in the determination condition storage section 102*e* of the RAM 102 (see FIG. 6), the determination condition data of which the set flag is "1", that is, the type of the determination condition specified by the user. At Step SB4 and thereafter, the CPU 100 executes the processing in accordance with the type of the determination condition it has read out (the "style", the "style+specified time slot", the "style+activation time slot", the "style+activation order" and the "style+number of activation"). Description of the operations will be continued with respect to the individual types of the determination conditions.

a. When the Type is the "Style"

When the type of the determination condition specified by the user is the "style", the judgment result at Step SB4 becomes "YES", and the CPU 100 advances to Step SB5, where it detects the current style based on the style data generated by the style detection section 110. Next, at Step SB6, the CPU 100 reads out, from the determination condition storage section 102*e* of the RAM 102, the function names of the first to third priority orders assigned to the current style, among the determination conditions associated with the "style". For example, when the detected current style is the "open style", the function names of the first to third priority orders, that is, the "address book", the "outgoing history" and the "incoming history", are respectively read out as shown in FIG. 6. Then, at Step SB7, the CPU 100 displays the function menu of the function names it has read out on the screen of the display section 106. As a result of this, the menu of the function names that are often used in the current style is automatically displayed.

Next, at Step SB8, the CPU 100 executes an audible guidance output in a synthesized voice the function names it has read out at the above-described Step SB6. The synthesized voice, for example, say "press Key 1 for the address book, press Key 2 for the outgoing history and press Key 3 for the incoming history." Then, at Steps SB9 and SB10, the CPU 100 judges whether a selection operation of the function by the user has been carried out in a certain period of time (for example, five seconds) after completion of the voice guidance. When judged that the certain period of time has passed without the selection operation by the user, the judgment result at Step SB10 becomes "YES", and the CPU 100 advances to Step SB11, where the CPU 100 clears the function menu displayed on the display screen of the display section 106 at the above-described Step SB7, and ends the present processing.

On the contrary, when judged that the selection operation is carried out by the user before the certain period of time has passed, the judgment result at the above-described Step SB9 becomes "YES", and the CPU 100 advances to Step SB12. At Step SB12, the CPU 10 stores the number of activation in the number of activation storage section 102*b* of the RAM 102. Specifically, among the numbers of activation associated with the function names and the styles stored in the number of activation storage section 102*b* of the RAM 102 (see FIG. 3), the CPU 100 increments the number of activation specified by the function name selected through the selection operation and the current style detected at Step SB5, and advances in the routine.

Subsequently, the CPU 100 advances to Step SB13, where it updates the activation history of the activation history storage section 102*c* of the RAM 102 (see FIG. 4). Specifically, among the activation history information registered in the activation history storage section 102*c*, the CPU 10 decrements, by one, each of the activation orders of the activation history information which corresponds to the current style detected in at Step SB51 as described above. At the same time, the CPU 100 newly registers, as new activation history information of the first activation order, the function name and the activation date and time (current date and time) selected through the selection operation. Next, at Step SB14, the CPU 110 activates the function having the function name selected through the selection operation, and ends the present processing.

b. When the Type is the "Style+Specified Time Slot"

When the type of the determination condition specified by the user is the "style+specified time slot", the judgment result at Step SB15 shown in FIG. 10 becomes "YES", and the CPU 100 advances to Step SB18, where it detects the current style based on the style data generated by the style detection section 110. Next, at Step SB19, the CPU 100 acquires the current time that is kept based on the real time clock generated by the RTC 109. Subsequently, at Step SB20, among the determination conditions associated with the "style+specified time slot", the CPU 110 reads out the function names of the first to third priority orders assigned to the current time and the current style, from the determination condition storage section 102*e* of the RAM 102.

For example, when the current time is "20:00" and the current style is the "view style", the function names of the first to third priority orders, that is, the "e-mail", the "photograph replay" and the "movie replay" are respectively read out as shown in FIG. 6. Subsequently, the CPU 110 executes Steps SB7 to SB14 (see FIG. 9) as described above. Specifically, at Steps SB7 to SB14, the CPU 100 displays the function menu of the function names that have been read out at the above-described Step SB20 on the screen of the display section 106, and provides the voice guidance of the function name. Next, when the selection operation of the function is performed by the user in a certain period of time after completion of the voice guidance, the CPU 100 stores the number of activation of the function selected by the user in the number of activation storage section 102*b* of the RAM 102, and after storing the activation history of the function selected in the activation history storage section 102*c* of the RAM 102, activates the function selected.

c. When the Type is the "Style+Activation Time Slot"

When the type of the determination condition specified by the user is the "style+activation time slot", the judgment result at Step SB16 becomes "YES", and the CPU 100 advances to Step SB21, where it detects the current style based on the style data generated by the style detection section 110. Next, at Step SB22, the CPU 100 acquires the current time that is kept based on the real time clock generated by the RTC 109. Subsequently, at Step SB23, the CPU 100 reads out the applicable function names from the activation history storage section 102*c* of the RAM 102 (see FIG. 4) based on the determination condition under which the functions associated with the "style+activation time slot" and activated at a time close to the time when the style is changed are displayed in descending order of closeness to the time. Specifically, among the activation histories stored in the activation history storage section 102*c* and the style of which matches the current style, the CPU 100 reads out the activated function names in descending order of closeness to the current time (excluding the date).

In the case where the activation history stored in the activation history storage section 102*c* of the RAM 102 is as shown in the example in FIG. 4. When the current time is "15:00" and the current style is the "view style", the function names are read out in descending order of closeness to "15:00", for example, the "photograph shooting (activation time: 15:00)", the "digital television (activation time: 10:00)" and the "movie replay (activation time: 21:00)" are read out sequentially. Subsequently, the CPU 100 executes Steps SB7 to SB14 as described above (see FIG. 9).

d. When the Type is the "Style+Activation Order"

When the type of the determination condition specified by the user is the "style+activation order", the judgment result at Step SB17 becomes "YES", and the CPU 100 advances to Step SB24, where it detects the current style based on the style data generated by the style detection section 110. Next, at Step SB25, the CPU 100 reads out, from the activation history storage section 102*c* of the RAM 102 (see FIG. 4), the applicable function names based on the determination condition under which the function names associated with the "style+activation order" and recently activated are displayed in descending order of closeness to the current time. Specifically, among the activation history stored in the activation history storage section 102*c* and the style of which matches the current style, the CPU 100 reads out the recently activated function names in descending order of closeness to the current time.

In the case where the activation history stored in the activation history storage section 102*c* of the RAM 102 is as shown in the example in FIG. 4. When the current style is the "open style", for example, the function names of the first to third activation orders, that is, the "address book", the "e-mail" and the "outgoing history" are read out. Subsequently, the CPU 100 executes Steps SB7 to SB14 as described above (see FIG. 9).

e. When the Type is the "Style+Number of Activation"

In the case where the type of the determination condition specified by the user is the "style+number of activation", all judgment results at Step SB4 shown in FIG. 9 and at Steps SB15 to SB17 shown in FIG. 10 become "NO", and the CPU 100 advances to Step SB26, where it detects the current style based on the style data generated by the style detection section 110. Next, at Step SB27, the CPU 100 reads out the function names activated a number of times from the number of activation storage section 102*b* of the RAM 102 (see FIG. 3) based on the determination condition under which the functions associated with the "style+number of activation" and activated a number of times are displayed in descending order of the number of activation.

In the case where that the numbers of activation stored in the number of activation storage section 102*b* of the RAM 102 are as shown in the example shown in FIG. 3. When the current style is the "view style", the function names of the first to third number of activation orders, for example, the "digital television (with the number of activation: 20 times)", the "photograph shooting (with the number of activation: 19 times)" and the "photograph replay (with the number of activation: 17 times)" are read out in descending order. Subsequently, the CPU 100 executes Steps SB7 to SB14 (see FIG. 9) as described above.

As described above, in the first embodiment, when the style of the housing is changed to the "open style" or the "view style", the CPU 100 automatically selects the candidates of the function names that are suitable for the current style after the change in accordance with the predetermined determination condition and displays the menu thereof, and provides voice guidance thereof. Therefore, the user does not need to examine which function is suitable for the style. As a result, operability after the style is changed is enhanced.

In addition, more specific advantageous effects achieved by the first embodiment as described above are as specified in (a) to (j).

(a) The embodiment enables the user to activate a desired function among reported candidates of functions merely by selecting the desired function.

(b) The embodiment enables the reporting to be stopped after a certain period of time has passed, and thus the operation to stop the reporting is not necessary even when the desired function is not present among the candidates of functions reported.

(c) The embodiment enables the candidates of the functions suitable for the style to be reported in accordance with the priority order.

(d) The embodiment enables the user to specify the priority order, and thus the user themselves can specify the candidates of the functions they desire.

(e) The embodiment enables the candidates of the functions to be recorded in accordance with the time activated in the past. Accordingly, by reporting the functions that were recently activated in descending order of closeness to the current time, the embodiment enables the user to easily use the functions that have been recently activated in that style again.

(f) The embodiment enables the candidates of the functions to be reported in accordance with the number of activation and the activation frequency of the function in the past.

Accordingly, by reporting the functions, for example, in descending order of the number of activation and the activation frequency, the embodiment enables the user to easily use the functions that are frequently activated in that style again.

(g) The embodiment enables the candidates of the functions suitable for the style to be reported in accordance with the time information.

(h) The embodiment enables the user to specify the time information, and thus the user can specify the candidates of the functions for each time slot when, for example, frequently used functions are different depending on the time slots even in the same style.

(i) The embodiment enables the candidates of the functions to be reported based on the time information such as the time and day of the week the functions were activated in the past. Accordingly, by reporting the previously activated functions in descending order of closeness to the current time (time slot), or by reporting the functions previously activated on the same day of the week (or weekdays/holidays) as the current day of the week in descending order of closeness to the current time, the embodiment enables the user to easily use the functions that were frequently activated in a similar situation in the past again.

(j) The embodiment enables the user to know the candidates of the application programs that are suitable for the style.

Note that, in the first embodiment as described above, the combination of the "style" and the "specified time slot" and the combination of the "style" and the "activation time slot" are used as examples of the determination condition to be stored in the storage section 102e of the RAM 102 (see FIG. 6). However, the combination is not limited to this. For example, the "style" and the "specified day of the week" may be combined, or the "style" and the "day of the week of activation (weekdays and holidays)" may be combined.

B. Second Embodiment

The second embodiment of the present invention will hereinafter be described referring to FIG. 11 and FIG. 12.

In the second embodiment, the CPU 100 realizes the functions of first activating means and second activating means.

FIG. 11 is a diagram showing one configuration example of the determination condition data which is stored in the determination condition storage section 102e according to the second embodiment. The determination condition data shown in the diagram consists of the determination conditions that are classified into the "open style" and the "view style". In the determination condition for the "open style", the function names of the first to third priority orders (a new e-mail creation, a received mail acknowledgment and a various mail settings) are registered. On the other hand, in the determination condition for the "view style", the function names of the first to second priority orders (a horizontal photographing and a vertical photographing) are registered.

Figure 12:
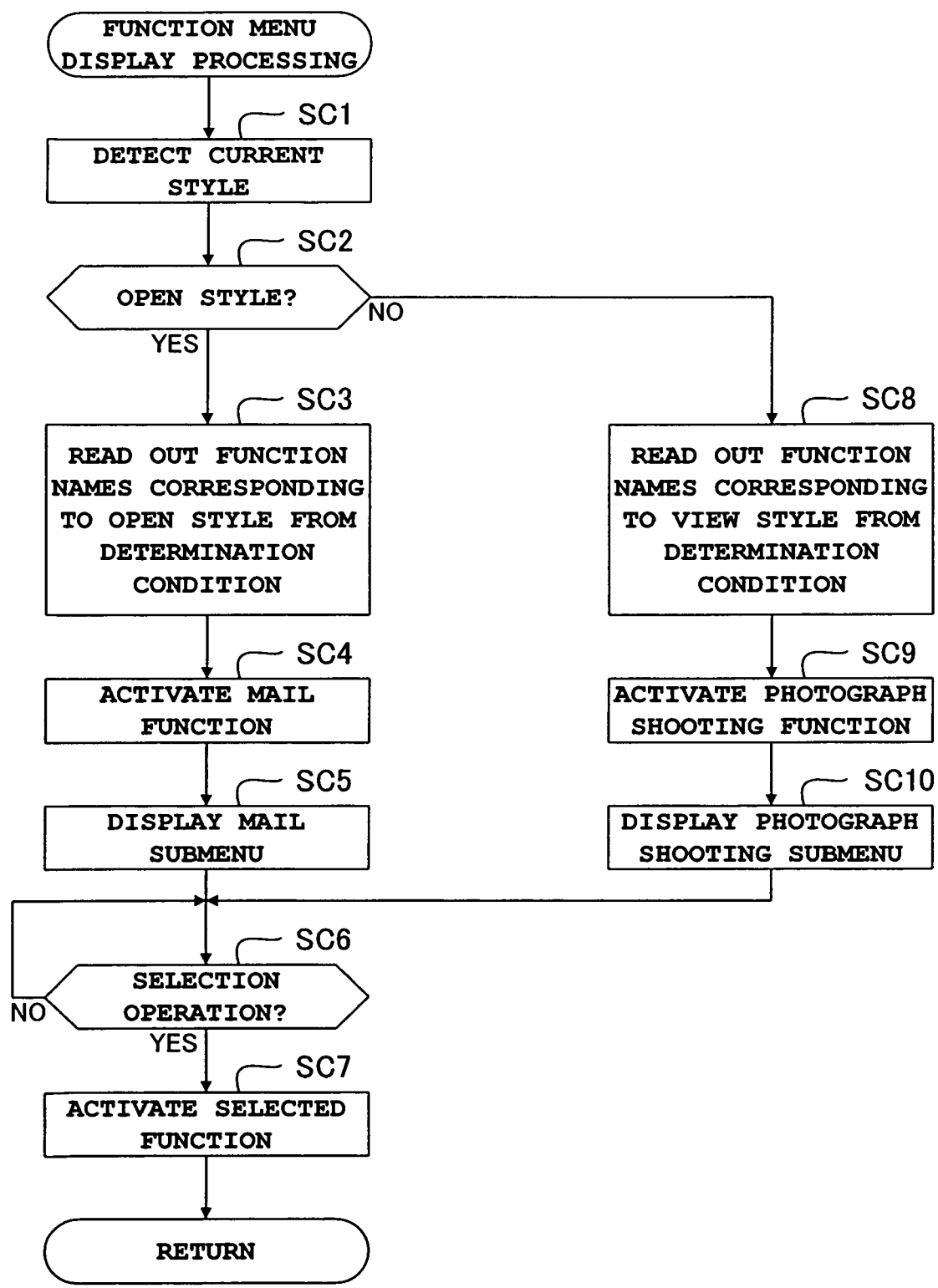
FIG. 12 is a flowchart showing an operation of function menu display processing according to the second embodiment.

FIG. 12 is a flowchart showing an operation of the function menu display processing according to the second embodiment. As is the case with the first embodiment as described above, when the function menu display processing according to the second embodiment is executed via Step SA16 (see FIG. 7) or Step SA17 (see FIG. 8) of the main routine, the CPU 100 advances the processing to Step SC1 shown in FIG. 12, where it detects the current style based on the style data generated by the style detection section 110. Next, at Step SC2, the CPU 100 judges whether or not the current style detected is the "open style". The operation will hereinafter be described separately for the case where the current style is the "open style" and for the case where it is the "view style".

a. When the Current Style is the "Open Style"

In this case, the judgment result at Step SC2 is "YES", and the CPU 100 advances to Step SC3. At Step SC3, the CPU 100 reads out, from the determination condition storage section 102e of the RAM 102 (see FIG. 11), the function names of the first to third priority orders (the new e-mail creation, the received mail acknowledgment, and the various mail setting) which are assigned to the "open style". Next, at Step SC4, the CPU 100 activates the mail function. Subsequently, at Step SC5, the CPU 100 displays the function names of the first to third priority orders (the new e-mail creation, the received mail acknowledgment, and the various mail setting) read out from the determination condition storage section 102e in the above-described Step SC3, in the display section 106 as the sub menu items of the mail function. Subsequently, the CPU 100 advances to Step SC6, where it stands by until any of the mail sub menu items is selected. Next, when any of the functions (of the mail sub menu items) is selected, the judgment result at Step SC6 becomes "YES", and the CPU 100 advances to Step SC7, where the CPU 100 activates the function selected and ends the present processing.

b. When the Current Style is the "View Style"

In this case, the judgment result at Step SC2 is "NO", and the CPU 100 advances to Step SC8. At Step SC8, the CPU 100 reads out the function names of the first to second priority orders (the horizontal photographing and the vertical photographing) which are assigned to the "view style" from the determination condition storage section 102e of the RAM 102 (see FIG. 11). Next, at Step SC9, the CPU 100 activates the photograph shooting function. In the subsequent Step SC10, the CPU 100 displays the function names of the first to second priority orders (the horizontal photographing and the vertical photographing) read out from the determination condition storage section 102e at Step SC8 as described above, in the display section 106 as the sub menu items of the photograph shooting function. Subsequently, the CPU 100 advances to Step SC6, where the CPU 100 stands by until any of the photograph shooting sub menu items is selected. When any of the functions (of the photograph shooting sub menu items) is selected, the judgment result at Step SC6 becomes "YES", and the CPU 100 advances to Step SC7, where the CPU 100 activates the function selected and ends the present processing.

As described above, in the second embodiment, the CPU 100 stores the sub menu items of the functions to be activated for each style in the determination condition storage section 102e, and activates the functions assigned to the style detected after the style is changed. At the same time, the CPU 100 reads out the sub menu items of the activated functions from the determination condition storage section 102e, and automatically displays it in the submenu. Therefore, the user does not need to examine which function is suitable for the style. As a result, operability after the style is changed is enhanced.

Note that, in the second embodiment as described above, description was given on the example where the mail function is assigned to the "open style", and the photograph shooting function is assigned to the "view style". However, the functions that are assigned to the individual styles in advance are not limited to these. It is to be understood that any function can be assigned to each style in accordance with the preference of the user.

In addition, in the first embodiment and the second embodiment as described above, the housing structure of the cellular phone is of a foldable opening-closing type, and the styles of the housing are the "open style" and the "view style". However, the housing structure and the styles are not limited to these.

In addition, the present invention is not limited to the cellular phone, and is also applicable to other electronic devices such as a notebook computer, a PDA, an electronic camera, a music reproducer or the like.

Furthermore, although the computer program product of the electronic device which is a preferred embodiment of the present invention is stored in the memory (for example, ROM, etc.) of the electronic device, this processing program is stored on a computer-readable medium and should also be protected in the case of manufacturing, selling, etc. of only the program. In that case, the method of protecting the program with a patent will be realized by the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. An electronic device, comprising:
   a detector for detecting a style which indicates a usage pattern based on a housing structure of the device;
   a memory for storing candidates of any function associated with the style and time information among a plurality of functions provided in the device;
   an acquisition unit for acquiring a current time;
   a read out unit for reading out candidates of the functions associated with the style detected by the detector from among the candidates of the functions stored in the memory based on the current time acquired by the acquisition unit when the style detected by the detector changes; and
   a reporting unit for reporting candidates of the functions read out by the read out unit.

2. The electronic device according to claim 1, wherein the time information stored in the memory is time information specified by a user; and
   wherein the read out unit reads out candidates of the functions associated with the style detected by the detector from among the candidates of the functions stored in the memory and the current time acquired by the acquisition unit.

3. The electronic device according to claim 1, wherein the time information stored in the memory is time information which indicates a past function activation time; and
   wherein the read out unit reads out candidates of the functions associated with the style detected by the detector from among the candidates of the functions stored in the memory and the current time acquired by the acquisition unit.

4. An electronic device, comprising:
   a detector for detecting a style, which indicates a usage pattern based on a housing structure of the device;
   a counter for counting activation frequencies of a plurality of functions provided in the device and automatically assigning the functions a priority order based on the activation frequencies;
   a memory for storing candidates of any of the plurality of functions associated with the style and a priority order previously assigned by a user or the priority order automatically assigned by the counter;
   a read out unit for reading out candidates of the functions associated with the style detected by the detector from among the candidates of the functions stored in the memory based on the stored priority order when the style detected by the detector changes;
   a reporting unit for reporting candidates of the functions read out by the read out unit.

5. The electronic device according to claim 1, wherein the functions are application programs executable by the device.

6. The electronic device according to claim 1, further comprising:
   a selector for selecting any function from among the candidates of the functions reported by the reporting unit; and
   an activator for activating the function selected by the selector.

7. The electronic device according to claim 1, further comprising a stop for stopping the reporting by the reporting unit after a certain period of time has passed.

8. A computer readable storage medium having a program of an electronic device stored thereon that is executable by a computer, comprising:
   detection processing which detects a style indicating a usage pattern based on a housing structure of the device;
   acquisition processing which acquires a current time;
   read out processing which reads out candidates of functions associated with the style detected by the detection processing from among candidates of functions associated with the style and time information stored in a memory based on the current time acquired by the acquisition processing when the style detected by the detection processing changes; and
   report processing which reports candidates of the functions read out by the read out processing.

9. A computer readable storage medium having a program of an electronic device stored thereon that is executable by a computer, comprising:
   detection processing which detects a style indicating a usage pattern based on a housing structure of the device;
   count processing which counts activation frequencies of a plurality of functions associated with the style and automatically assigns the functions a priority order based on the activation frequencies;
   read out processing which reads out candidates of functions associated with the style detected by the detection processing from among candidates of the plurality of functions associated with the style and a priority order previously assigned by a user or the priority order automatically assigned by the count processing stored in a memory based on the stored priority order when the style detected by the detection processing changes; and
   report processing which reports candidates of the functions read out by the read out processing.

10. The electronic device according to claim 4, wherein the functions are application programs executable by the device.

11. The electronic device according to claim 4, further comprising:
    a selector for selecting any function from among the candidates of the functions reported by the reporting unit; and
    an activator for activating the function selected by the selector.

12. The electronic device according to claim 4, further comprising a stop for stopping the reporting by the reporting unit after a certain period of time has passed.

* * * * *